(12) United States Patent
Cloutier

(10) Patent No.: US 6,582,215 B2
(45) Date of Patent: Jun. 24, 2003

(54) AUTOMATIC SLUG FEEDER FOR GOLF BALL CORE FORMING APPARATUS

(75) Inventor: Mark Cloutier, Wilbraham, MA (US)

(73) Assignee: Spalding Sports Worldwide, Inc., Chicopee, MA (US)

( * ) Notice: Subject to any disclaimer, the term of this patent is extended or adjusted under 35 U.S.C. 154(b) by 287 days.

(21) Appl. No.: 09/832,423

(22) Filed: Apr. 11, 2001

(65) Prior Publication Data

US 2002/0150647 A1 Oct. 17, 2002

(51) Int. Cl.[7] .............................................. B29C 51/02
(52) U.S. Cl. ........................ 425/140; 425/145; 425/173; 425/215; 425/297; 425/327; 425/377
(58) Field of Search ................................. 425/140, 145, 425/173, 215, 297, 327, 377

(56) References Cited

U.S. PATENT DOCUMENTS

| | | | | |
|---|---|---|---|---|
| 2,738,825 A | * | 3/1956 | McElroy | ..................... 425/297 |
| 3,422,648 A | | 1/1969 | Lemelson | |
| 3,932,104 A | | 1/1976 | Schneider | |
| 4,003,498 A | | 1/1977 | Moneghan | |
| 4,508,309 A | * | 4/1985 | Brown | ......................... 249/81 |
| 5,273,418 A | * | 12/1993 | Kato et al. | ................... 425/297 |
| 6,036,907 A | * | 3/2000 | Tanaka et al. | ............... 264/250 |
| 6,096,255 A | * | 8/2000 | Brown et al. | ................ 264/248 |
| 6,436,327 B1 | * | 8/2002 | Cloutier et al. | .............. 264/248 |

\* cited by examiner

*Primary Examiner*—James P. Mackey
*Assistant Examiner*—Joseph Leyson

(57) ABSTRACT

An automatic slug feeding device for delivering slugs to a compression mold for molding golf ball cores is characterized by synchronized rotary transfer, slug conveyance, gripping mechanism transfer and a tray conveyor for transferring slugs from an extruder to a mold loading robotic arm, and subsequently to a mold press. The rotary transfer device receives slugs from the extruder and the slug conveyor linearly conveys individual slugs from the transfer device. The gripping mechanism simultaneously removes a plurality of slugs from the conveyor and deposits them in an array of receptacles in a molding trays which are shuttled to an unload position, where the mold loading robotic arm transfers slugs into a mold press. Storage of extruded slugs prior to compression molding is thus eliminated, cycle time is reduced, core quality is improved, and operator safety is maximized.

13 Claims, 4 Drawing Sheets

AUTOMATIC SLUG FEEDER FOR GOLF BALL CORE FORMING APPARATUS

BACKGROUND OF THE INVENTION

Most golf balls currently in use have one of three types of cores: solid, wound, or liquid. The different types of cores result in golf balls having different characteristics, especially in the feel of the ball when struck. Generally, a soft feel is desirable to a skilled golfer, and this can be achieved using a softer core material.

Solid cores are formed of various materials including polybutadiene, natural rubber, metallocene catalyzed polyolefin, polyurethane, other thermoplastic or thermoset elastomers, and mixtures of one or more of these materials. The core material is generally in the form of a slug which is compression molded to form a spherical core. The cores may be formed from a uniform composition or may have two or more layers. Though the cores produced from these materials are solid, the materials provide a soft feel to the ball.

BRIEF DESCRIPTION OF THE PRIOR ART

Typically, core material is heated and extruded to form an elongated slug which is cut into pieces to form the individual core slugs. The heated slugs are stored in bulk for eventual delivery to a molding cell. At the cell, a plurality of slugs are manually arranged in the proper orientation in a mold press to simultaneously form a plurality of cores.

One major drawback of the conventional golf ball core forming techniques is that the heated slugs from the extruder cool during storage. Another drawback is that extruded slugs must be powdered to prevent them from sticking to one another during bulk storage. Some materials used in the powdering process cause early failure of mold coatings and reduce the durability of some cores. A further drawback is that human errors result in misaligned slugs which in turn results in defective cores. In addition, the proximity of human operators to the mold press for slug loading and core unloading limits the temperature of the molds for operator safety.

The present invention was developed to eliminate the need for bulk storage of the slugs, thus conserving internal heat from extrusion, eliminating the need for powdering, and reducing mold cycle time. Moreover, the invention was developed to eliminate misalignment of the slugs by providing a device for transferring a plurality of slugs from the extruder directly to a core molding press, thereby reducing rejects and improving overall quality of the cores. Operator injury is avoided and the absence of human intervention allows the molds to be heated quicker and cooled less to further reduce cycle time and increase output.

SUMMARY OF THE INVENTION

Accordingly, it is a primary object of the invention to provide a slug feeder device including a rotary transfer mechanism including grippers for receiving slugs from a slug extruder and cutter, a conveyor for linearly conveying individual slugs from the transfer mechanism and a gripping mechanism for simultaneously removing a plurality of slugs from the conveyor and depositing them in an array of cavities in a molding tray. The operation of the transfer and gripping mechanisms as well as the conveyor are all controlled for synchronous movement to maximize the efficiency of the feeding operation.

According to a further object of the invention, the grippers on the rotary transfer mechanism are able to detect whether the slugs from the extruder are properly oriented and configured. Those slugs which are defective are released from the grippers of the rotary transfer mechanism prior to the conveyor for recycling. In addition, the absence of a slug from a gripper of the rotary transfer mechanism is detected. The conveyor includes a plurality of receptacles, each of which is adapted to receive a slug from the rotary transfer device. If a slug is not presented to the conveyor by a gripper of the rotary transfer device, movement of the conveyor is delayed until a slug is presented. In this manner, no empty receptacles are conveyed to the gripping mechanism.

According to another object of the invention, the gripping mechanism includes a plurality of grippers which are linearly arranged and spaced above the receptacles of the conveyor for simultaneously removing a selected number of adjacent slugs from the conveyor. The gripping mechanism is movable about six axes to orient the slugs relative to the cavities in the molding tray for simultaneously depositing the slugs in a row of cavities in the tray.

BRIEF DESCRIPTION OF THE FIGURES

Other objects and advantages of the invention will become apparent from a study of the following specification when viewed in the light of the accompanying drawings, in which.

DETAILED DESCRIPTION

Figure 1:
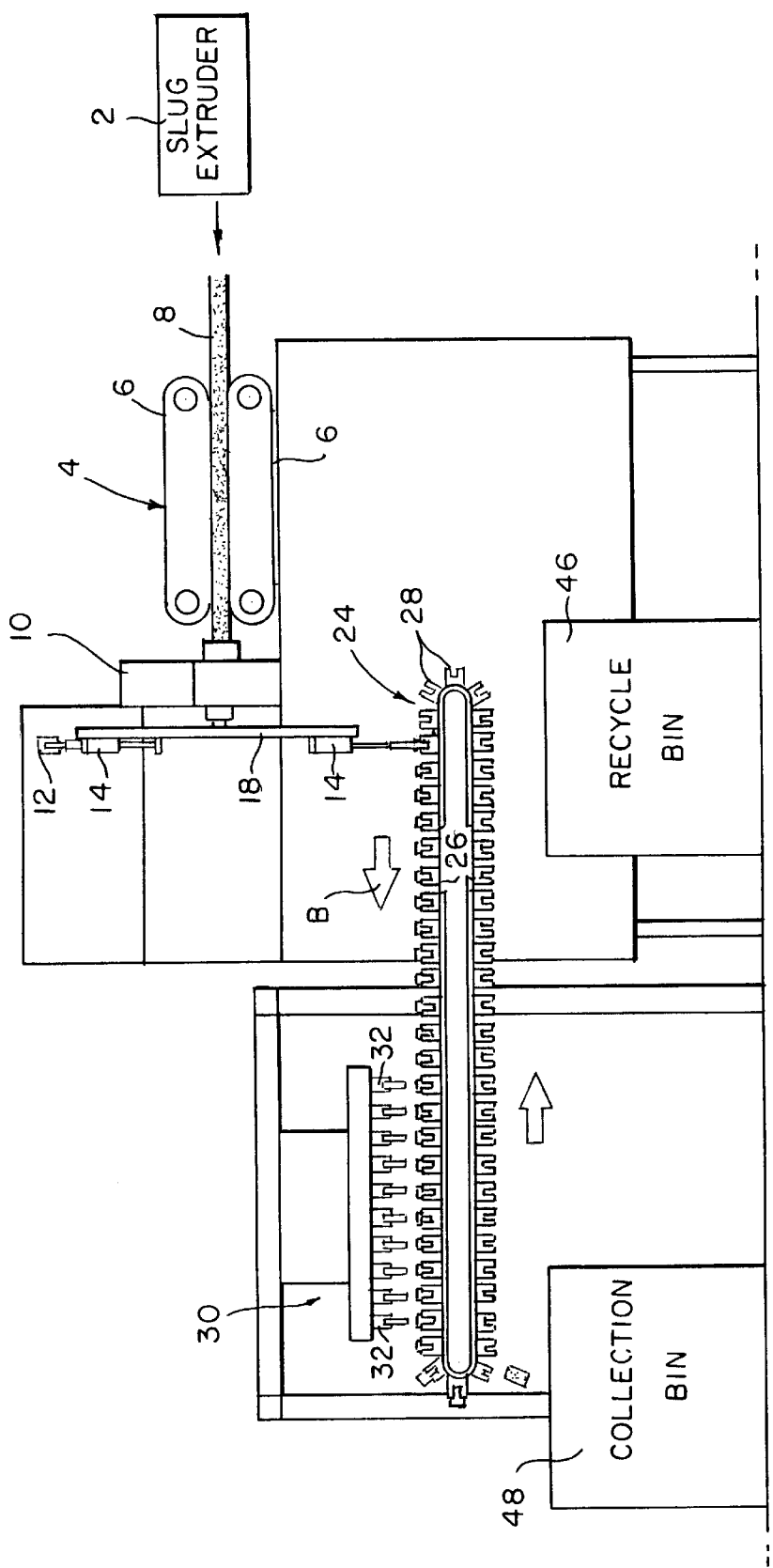
FIG. 1 is a front plan view of the automatic slug feeding device according to the invention.

The automatic slug feeding device used in the manufacture of golf ball cores according to the invention will first be described in connection with FIG. 1. A slug extruder 2 heats and mixes slug material, for example polybutadiene, natural rubber, metallocene catalyzed polyolefin, polyurethane, other thermoplastic or thermoset elastomers, and mixtures of one or more of these materials. From the extruder 2, the slug material is fed into a puller assembly 4 comprising a pair of opposed belts 6 which form the material into an elongated slug 8. The elongated slug is fed to a cutting assembly 10 which shears individual slugs from the elongated slug 4. The individual slugs preferably have a uniform configuration and size.

Figure 2:
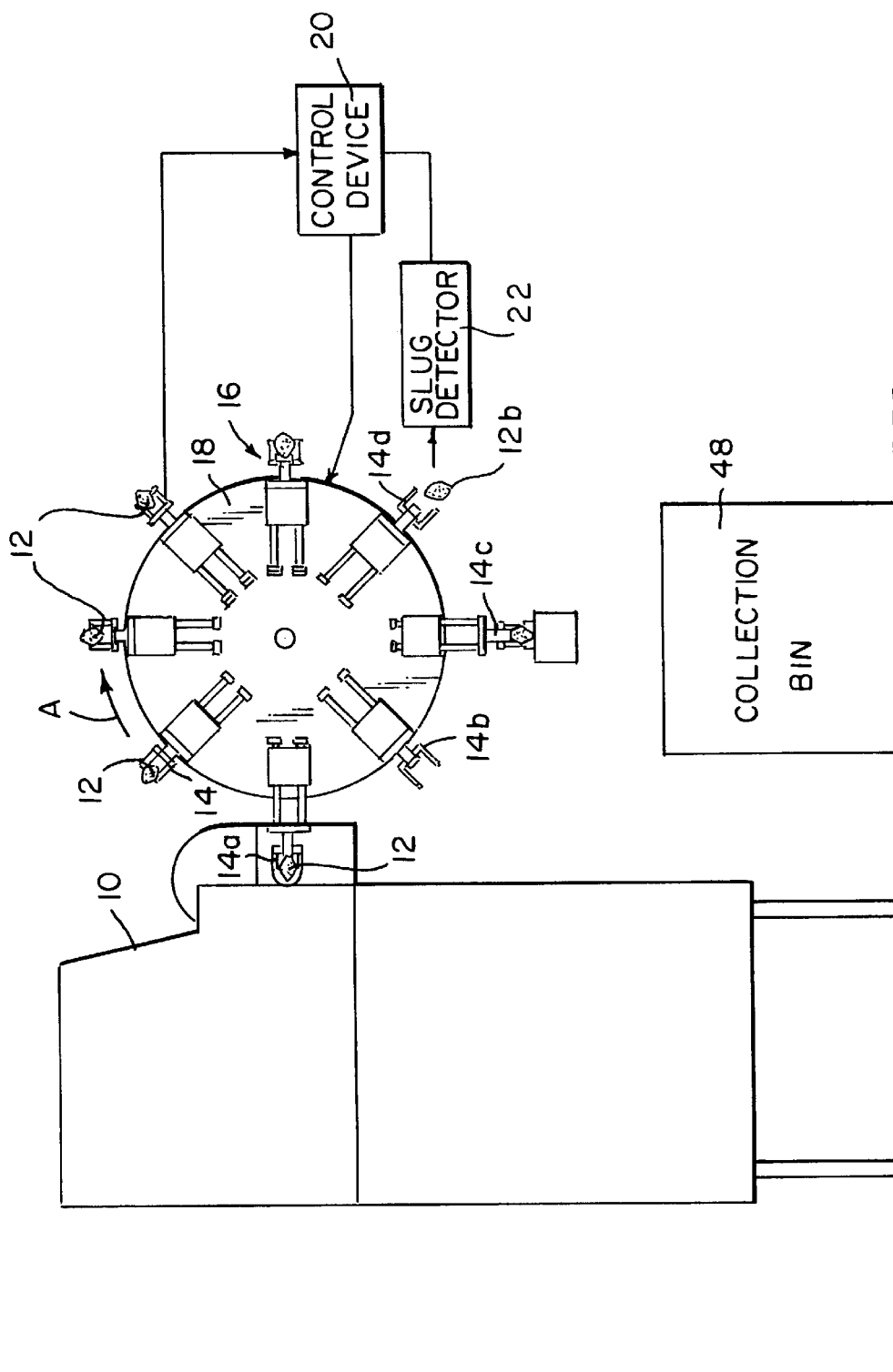
FIG. 2 is an end plan view of the rotary transfer mechanism of the slug feeding device of FIG. 1.

As each individual slug 12 is cut at the cutting assembly 10, it is grasped by a gripper 14 on a rotary transfer device 16 as shown in FIG. 2. The rotary transfer device preferably comprises a wheel 18 which rotates about a horizontal axis in the direction of the arrow A and a plurality of radially extending grippers 14 which are operable to grasp and release individual slugs. The grippers 14 are also operable to extend from the wheel for receiving a slug from the cutting assembly and retract toward the wheel for rotary transport.

Contraction of the grippers to grasp a slug is sensed by a control device 20. More particularly, when a properly oriented and configured slug is grasped by the grippers, a normal signal is generated to the control device. However, when the grippers contract too far or not far enough as the result of a misoriented or misconfigured slug therein, or in the absence of a slug, an error signal is delivered to the control device 20. The control device 20 controls the rotation of the wheel 18, the extension and retraction of the grippers 14, and the opening and closing of the grippers to grasp and release the slugs. When an error signal is generated by the grippers 14, the control device activates the grippers to open and dispose of a defective slug as will be developed in greater detail below.

A detector 22, such as a through-beam detector, is arranged adjacent to the rotary transfer wheel 18 to detect the absence of a slug in a gripper prior to the gripper reaching a conveyor 24 as will be described below.

Referring back to FIG. 1, the conveyor 24 is arranged below the rotary transfer device 16. The conveyor comprises an endless belt 26 on which are mounted a plurality of linearly arranged spaced receptacles 28 having open ends which extend upwardly when the receptacles are on the upper run of the belt. As the wheel 18 rotates a gripper having a slug to the lowermost position, the gripper is extended and opened to its release position to deposit a slug 12 into the adjacent receptacle. Each receptacle receives a slug and conveys it in the direction of the arrow B to a gantry or gripping mechanism 30 downstream of the rotary transfer mechanism 16.

The gripping mechanism includes a plurality of grippers 32 which are linearly arranged in spaced relation above the receptacles 28 on the conveyor so that one gripper is above each receptacle when the gripping mechanism is in a receive position. In the embodiment shown in FIG. 1, the gripping mechanism 30 includes ten grippers 32. The gripping mechanism is capable of motion in three dimensions. From the receive position shown in FIG. 1, the gripping mechanism is displaced downwardly and the grippers are activated to simultaneously grasp a plurality of slugs from the adjacent receptacles. As will be developed below, less than the ten grippers shown in the preferred embodiment may be activated depending on the number of slugs which need to be removed from the conveyor.

Figure 3:
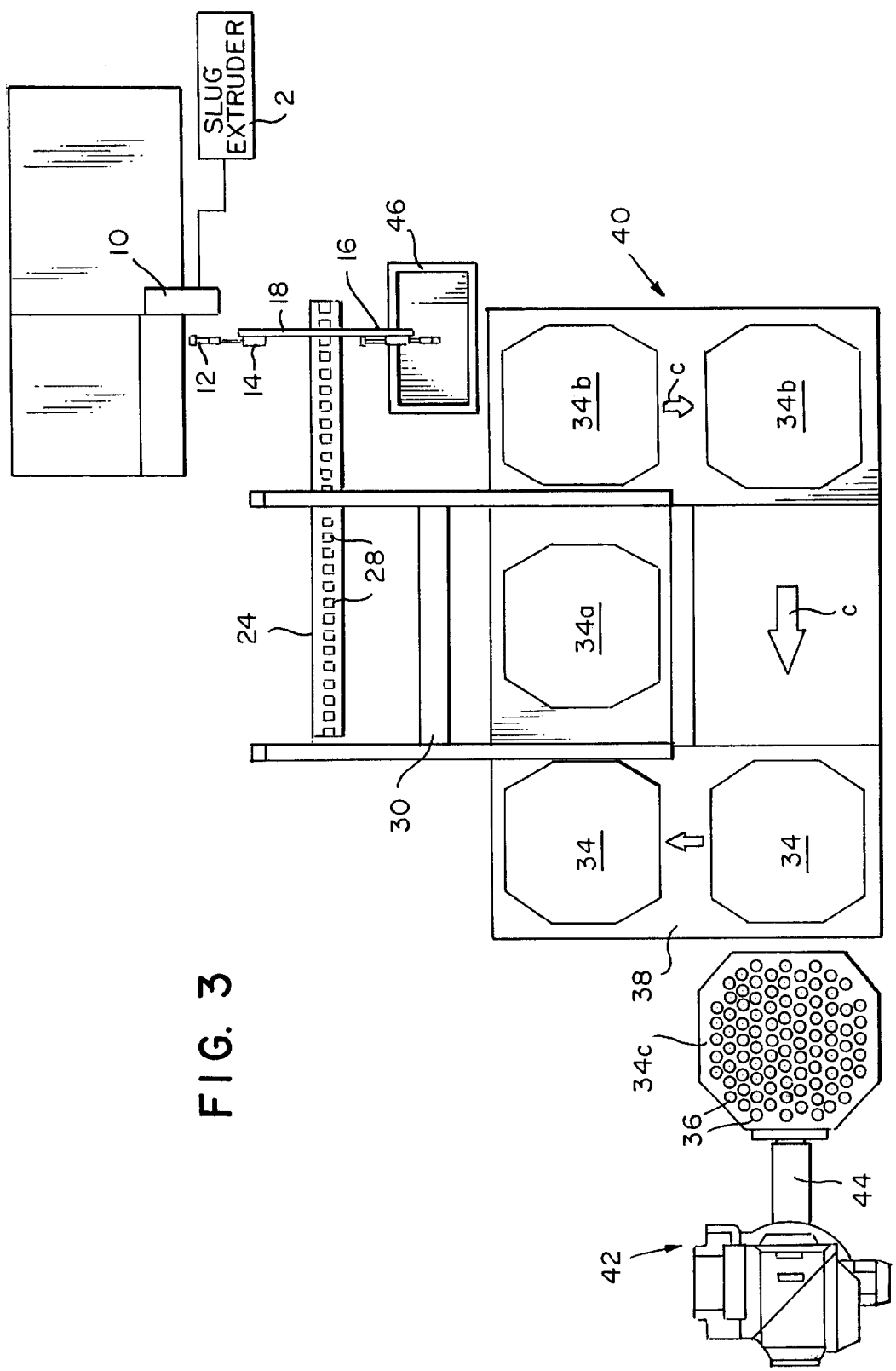
FIG. 3 is a top plan view of the rotary transfer mechanism of the slug feeding device of FIG. 1.

The gripping mechanism is provided to transfer slugs from the conveyor to a molding tray 34 which contains a plurality of receptacles 36 in an upper surface thereof as shown in FIG. 3. The receptacles are arranged in rows and spaced the same distance as the spacing of the receptacles 28 of the conveyor and the grippers 32 of the gripping mechanism. With slugs retained in a plurality of the grippers 32, the gripping mechanism is raised from the receive position and articulated to a deposit position above a selected row of receptacles in the molding tray 34. In FIG. 3, the tray 34a is in the fill position where row after row of the receptacles thereof are sequentially filled with slugs until all of the receptacles of the tray have slugs therein, with each slug being uniformly oriented.

The trays rest on a tray conveyor 38 and are conveyed in the direction of the arrows C to a manual loading position 40 where any empty cavities in the trays (34b) can be manually filled with slugs. From the manual loading position, the trays are conveyed to a molding station 42 as shown by the tray 34c. There, a robotic arm 44 grasps the contents of a tray and inserts it into a mold press (not shown). In the press, one or more tray loads of slugs are compression molded to form a plurality of golf ball cores. Empty trays 34 are recirculated by the tray conveyor 38 to be refilled with slugs.

Figure 4:
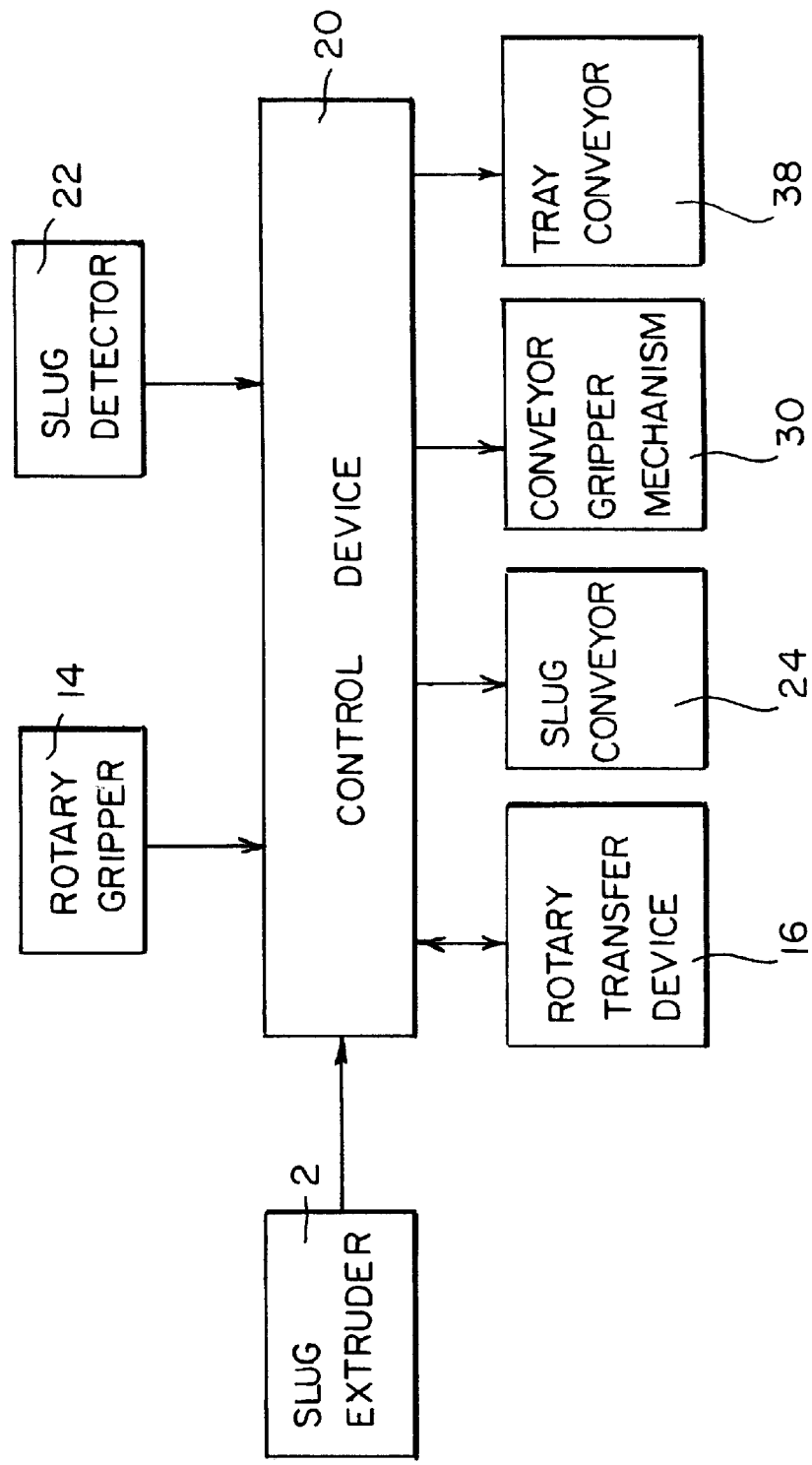
FIG. 4 is a block diagram of the control mechanism for controlling the components of the slug feeding device of the invention.

As shown in FIG. 4, the control device 20 receives input signals from the slug extruder 2, the slug detector 22, and the rotary transfer device 16 and provides output control signals for the rotary transfer device 16, the slug conveyor 24, the gripper mechanism 30, and the tray conveyor 38. If desired, the control device can also control the molding station 42 to control the transfer of slugs to and from the mold press.

The operation of the automatic slug feeder according to the invention will now be described. When the slug extruder 2 is energized to produce an elongated slug, the cutting device 10 cuts individual slugs therefrom. As each slug 12 is cut, the control device operates a gripper 14a on the rotary transfer device 16 to extend, grasp a cut slug and retract. Next, the control device indexes the rotary transfer device to rotate so that the next empty gripper 14b is adjacent to the cutting device to receive the next cut slug. The rotary transfer device is continually indexed to rotate the slugs from a pickup position as shown by the gripper 14a to a transfer position shown by the gripper 14c. If a misshapen or misoriented slug is detected by the grippers because of improper contraction thereof, an error signal is sent to the control device 20 which then causes the gripper 14d having a defective or misoriented slug to release the slug prior to reaching the transfer position. The released slug 12b is deposited in recycle bin 46 (FIGS. 1 and 3). Slugs from the recycle bin are returned to the extruder for remanufacture of new slugs. Between the pickup and transfer positions, the grippers pass by the slug detector 22. The presence of a slug is detected by a through-line beam detector. If a slug is not present in the gripper at the detector, a signal is sent to the control device which is used to control indexing movement of the slug conveyor 24 as will be described below.

At the transfer position represented by the gripper 14c, the slug is deposited in a receptacle 28 of the slug conveyor 24. The gripper 14c is extended and opened to release the slug, and then retracted, all under control of the control device. As the rotary transfer device is indexed to bring the next slug to the transfer position, so too is the slug conveyor indexed by the control device to bring the next empty receptacle to the transfer position. In the event that an empty gripper arrives at the transfer position owing to either the absence of a slug at the detector 22 or the release of a defective slug, movement of the conveyor is interrupted under control of the control device. In this manner, no empty receptacles 28 on the conveyor are conveyed down the upper run of the conveyor 24.

Depending on the number of receptacles 36 in the row to be filled on the mold tray 34, the gripping mechanism 30 is operable to simultaneously grasp that number of slugs from the receptacles 28 on the slug conveyor 24. For example, the top row of the tray 34c shown in FIG. 3 has five receptacles. Thus, the control device operates only five central grippers 32 on the gripping mechanism 30 to grasp slugs from the slug conveyor receptacles. After the first row of receptacles is filled, the gripping mechanism returns to the receive position above the slug conveyor and the appropriate number of grippers are activated to grasp the number of slugs corresponding to the number of receptacles in the next row. In the example shown, the second row on the mold tray 36 has eight receptacles, so eight grippers 32 are operated to remove only eight slugs from the slug conveyor.

Any slugs not removed from the receptacles by the grippers are deposited in a collection bin 48 at the end of the upper run of the slug conveyor. These slugs can be used at the manual filling station 40 for filling any empty receptacles in a mold tray or recycled in the extruder.

After a tray is filled by the gripping mechanism, the tray conveyor 38 is indexed by the control device to bring an empty tray to the fill position. In addition, the control device can operate the robotic arm 44 to remove and return slugs from the trays at the unload station during the molding process.

While the rotary transfer device 16 is shown having eight grippers 14 and the gripping mechanism 30 is shown having ten grippers 32, it will be appreciated that any convenient number of grippers may be provided. In addition, while the grippers 32 on the gripping mechanism are shown having a fixed spacing therebetween, the grippers 32 could be adjustably connected with the gripping mechanism to vary the spacing between adjacent grippers.

With the automatic slug feeder of the invention, heated slugs 12 from the extruder can be immediately transferred to a mold press to form golf ball cores without any need to store the slugs. By way of example, using molding trays containing ninety-two cavities, the automatic slug feeder of the invention is capable of filling two slug trays every three minutes. This conforms with the mold time required for the slugs from a pair of trays in a compression mold. Thus, as the slugs from a first pair of trays are being molded, a second pair of trays are being filled with slugs. Under control of the control device, the automatic slug feeder can continuously fill trays to eliminate any down time between extrusion of a slug and molding the slug into a golf ball core. This results in faster mold times, and the automatic transfer of slugs affords controlled orientation and temperature parameters resulting in more consistent cores being formed. In addition, operator safety is increased and slug storage and powdering costs are eliminated.

While the preferred forms and embodiments of the invention have been illustrated and described, it will be apparent to those of ordinary skill in the art that various changes and modifications may be made without deviating from the inventive concepts set forth above.

What is claimed is:

1. A slug feeder device, comprising
   (1) a rotary transfer mechanism for receiving slugs from a slug extruder;
   (2) a conveyor for linearly conveying individual slugs from said rotary transfer mechanism;
   (3) a gripping mechanism for simultaneously removing a plurality of slugs from said conveyor and depositing them in an array of receptacles in a molding tray; and
   (4) means for controlling the operation of said transfer mechanism, said conveyor, and said gripping mechanism, whereby slugs are automatically fed to a compression mold for forming golf ball cores therefrom.

2. A slug feeder device as defined in claim 1, wherein said rotary transfer mechanism has a horizontal axis and a plurality of radially extending first grippers which are operable between open and closed positions to grip a slug from the slug extruder and release a slug.

3. A slug feeder device as defined in claim 2, wherein said control means intermittently rotates said rotary transfer mechanism, whereby slugs are successively gripped from the slug extruder and subsequently released.

4. A slug feeder device as defined in claim 2, wherein said first grippers can determine whether slugs arranged therein are properly configured and oriented.

5. A slug feeder device as defined in claim 4, wherein said control means operates said first grippers to release improperly configured and oriented slugs prior to the conveyor, whereby rejected slugs may be recycled.

6. A slug feeder device as defined in claim 4, and further comprising a slug detector adjacent to said rotary transfer mechanism for determining whether a slug is present in a gripper.

7. A slug feeder device as defined in claim 4, wherein said conveyor comprises a plurality of spaced receptacles each of which receives an acceptable slug from said rotary transfer mechanism.

8. A slug feeder as defined in claim 7, wherein said control means intermittently displaces said conveyor following deposit of an acceptable slug in a receptacle, whereby successive receptacles downstream of said rotary transfer device each contain a slug.

9. A slug feeder as defined in claim 8, wherein said conveyor comprises an endless belt having said receptacles mounted thereon, said receptacles depositing any slugs not removed therefrom by said gripping mechanism at an end of an upper run of said conveyor into a collection bin.

10. A slug feeder as defined in claim 8, wherein said gripping mechanism includes a plurality of second grippers arranged in linear spaced relation above said conveyor whereby said second grippers are arranged opposite said conveyor receptacles for removing slugs therefrom.

11. A slug feeder as defined in claim 10, wherein said control means displaces said gripper mechanism in three dimensions to successively align and deposit a plurality of slugs in rows of receptacles in the molding tray.

12. A slug feeder as defined in claim 1, and further comprising means for displacing a tray relative to said gripping mechanism, whereby empty trays are successively delivered to an automatic loading station where slugs are deposited in the tray receptacles by said gripping mechanism.

13. A slug feeder as defined in claim 12, wherein said tray displacing means delivers empty trays to a manual loading station.

* * * * *